(12) United States Patent
Yang et al.

(10) Patent No.: US 10,503,001 B2
(45) Date of Patent: Dec. 10, 2019

(54) DISPLAY MODULE, AND DISPLAY DEVICE

(71) Applicant: BOE Technology Group Co., Ltd., Beijing (CN)

(72) Inventors: Yafeng Yang, Beijing (CN); Wei Wang, Beijing (CN); Xiaochuan Chen, Beijing (CN); Xue Dong, Beijing (CN); Jifeng Tan, Beijing (CN); Xianqin Meng, Beijing (CN); Xiandong Meng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/027,972

(22) Filed: Jul. 5, 2018

(65) Prior Publication Data

US 2019/0086713 A1 Mar. 21, 2019

(30) Foreign Application Priority Data

Sep. 20, 2017 (CN) .......................... 2017 1 0851177

(51) Int. Cl.
*G02F 1/1335* (2006.01)
*G02F 1/1343* (2006.01)
*G02F 1/1333* (2006.01)
*G02F 1/137* (2006.01)

(52) U.S. Cl.
CPC .... *G02F 1/133504* (2013.01); *G02F 1/13439* (2013.01); *G02F 1/133345* (2013.01); *G02F 1/133514* (2013.01); *G02F 2001/13706* (2013.01); *G02F 2001/134381* (2013.01); *G02F 2201/30* (2013.01)

(58) Field of Classification Search
USPC .................................................... 349/15, 201
See application file for complete search history.

(56) References Cited

U.S. PATENT DOCUMENTS

| 4,729,637 A * | 3/1988 | Sato ..................... C09K 19/601 349/106 |
| 5,552,911 A * | 9/1996 | Okada ............... G02F 1/134336 349/106 |
| 6,104,459 A * | 8/2000 | Oike ................. G02F 1/133514 349/105 |
| 2001/0055082 A1* | 12/2001 | Kubo ................ G02F 1/133371 349/114 |
| 2005/0179847 A1* | 8/2005 | Miyachi ................. C09K 19/02 349/141 |

(Continued)

*Primary Examiner* — James A Dudek
(74) *Attorney, Agent, or Firm* — Arent Fox LLP; Michael Fainberg

(57) ABSTRACT

The display module includes a first substrate, a second substrate, a first electrode, a liquid crystal layer, a second electrode, and a plurality of gratings and drive electrodes, wherein the liquid crystal layer includes only positive liquid crystal molecules; both a refractive index of the first electrode and a refractive index of the first substrate are greater than a normal refractive index $n_o$ of liquid crystal in the liquid crystal layer; and a refractive index of each of the plurality of gratings lies between the normal refractive index $n_o$ and an abnormal refractive index $n_e$ of the liquid crystal.

20 Claims, 1 Drawing Sheet

(56) References Cited

U.S. PATENT DOCUMENTS

| | | | |
|---|---|---|---|
| 2006/0227283 A1* | 10/2006 | Ooi | G02F 1/13306 349/201 |
| 2007/0121046 A1* | 5/2007 | Toko | G02F 1/133377 349/127 |
| 2007/0121210 A1* | 5/2007 | Sato | G02B 5/1866 359/569 |
| 2007/0146625 A1* | 6/2007 | Ooi | G02B 3/08 349/200 |
| 2009/0066890 A1* | 3/2009 | Harding | G02F 1/133555 349/106 |
| 2009/0323014 A1* | 12/2009 | Cunningham | G02B 5/28 351/44 |
| 2012/0092586 A1* | 4/2012 | He | G02F 1/29 349/61 |
| 2012/0092590 A1* | 4/2012 | Shestak | G02F 1/133504 349/62 |
| 2012/0206677 A1* | 8/2012 | Chung | G02F 1/133516 349/97 |
| 2012/0206678 A1* | 8/2012 | Kim | G02F 1/133516 349/106 |
| 2012/0212693 A1* | 8/2012 | Kubota | G02F 1/133707 349/96 |
| 2012/0327350 A1* | 12/2012 | Chang | G02F 1/133371 349/139 |
| 2013/0135563 A1* | 5/2013 | Kubota | G02F 1/134363 349/96 |
| 2014/0049732 A1* | 2/2014 | Xie | G02F 1/134363 349/96 |
| 2016/0334556 A1* | 11/2016 | Wu | G02B 5/207 |
| 2016/0356943 A1* | 12/2016 | Choi | G02F 1/1323 |
| 2017/0023807 A1* | 1/2017 | Chang-Hasnain | G02F 1/0131 |
| 2017/0139222 A1* | 5/2017 | Yang | G02B 27/22 |
| 2018/0237694 A1* | 8/2018 | Archambeau | G02F 1/29 |
| 2018/0246361 A1* | 8/2018 | You | G02F 1/1337 |
| 2018/0341128 A1* | 11/2018 | Ito | G02F 1/133371 |
| 2018/0364505 A1* | 12/2018 | Tan | G02F 1/1326 |
| 2018/0364525 A1* | 12/2018 | Murata | G02B 6/0025 |
| 2019/0004365 A1* | 1/2019 | Tan | G02F 1/133504 |
| 2019/0011735 A1* | 1/2019 | Tan | G02F 1/1334 |
| 2019/0011801 A1* | 1/2019 | Komanduri | G02F 1/29 |
| 2019/0033507 A1* | 1/2019 | Wang | G02B 6/0036 |
| 2019/0041746 A1* | 2/2019 | Qi | G03F 7/0007 |
| 2019/0094575 A1* | 3/2019 | Wang | G02F 1/134309 |
| 2019/0121171 A1* | 4/2019 | Tan | G02F 1/137 |
| 2019/0220124 A1* | 7/2019 | Tan | G02F 1/133504 |
| 2019/0243177 A1* | 8/2019 | Netter | G02F 1/13306 |

* cited by examiner

DISPLAY MODULE, AND DISPLAY DEVICE

CROSS-REFERENCE TO RELATED APPLICATION

This Application claims priority to Chinese Patent Application No. 201710851177.6, filed on Sep. 20, 2017, the content of which is incorporated by reference in the entirety.

TECHNICAL FIELD

This disclosure relates to the field of display technologies, and particularly to a display module, and a display device.

DESCRIPTION OF THE RELATED ART

An optical waveguide display device in the related art includes a display module and a backlight module; and the display module includes an array substrate and a color filter substrate, both of which are cell-assembled with each other, and a liquid crystal layer arranged between the array substrate and the color filter substrate. The optical waveguide display device in the related art is generally fabricated by orienting the two substrates through rubbing alignment technology or non-rubbing alignment technology to induce an arrangement direction of liquid crystal molecules.

The optical waveguide structure of the display module in the related art is arranged on the array substrate, so the array substrate is generally oriented using polyimide (PI) by coating PI directly on an upper surface of the array substrate, thus resulting in poor uniformity of the orientation layer, and degrading a light exiting effect.

SUMMARY

Embodiments of the disclosure provide a display module, and a display device.

In one aspect, the embodiments of the disclosure provide a display module including a first substrate and a second substrate, both of which are cell-assembled with each other, and a first electrode, a liquid crystal layer, and a second electrode arranged between the first substrate and the second substrate in that order, wherein the display module further includes a plurality of gratings distributed in an array on a surface of the first electrode on a side thereof facing the liquid crystal layer, and drive electrodes arranged respectively on sides of respective gratings facing away from the first electrode; the liquid crystal layer includes only positive liquid crystal molecules; wherein both a refractive index of the first electrode and a refractive index of the first substrate are greater than a normal refractive index $n_o$ of liquid crystal in the liquid crystal layer; and a refractive index of each of the plurality of gratings lies between the normal refractive index $n_o$ and an abnormal refractive index $n_e$ of the liquid crystal.

In some embodiments, the liquid crystal is blue-phase liquid crystal.

In some embodiments, the refractive index of the first electrode is greater or less than the refractive index of the first substrate.

In some embodiments, the display module further includes a first insulation layer arranged on the surface of the first electrode on the side thereof facing the liquid crystal layer, and a second insulation layer arranged on a surface of the second electrode on a side thereof facing the liquid crystal layer; the plurality of gratings are arranged on a surface of the first insulation layer on a side thereof facing the liquid crystal layer.

In some embodiments, both a refractive index of the first insulation layer and a refractive index of the second insulation layer are greater than the normal refractive index $n_o$ of the liquid crystal.

In some embodiments, a length of each of the plurality of gratings is equal to a length of a corresponding drive electrode, and the length of each of the plurality of gratings is equal to a transverse spacing between adjacent gratings, along a row direction of the plurality of gratings; and a width of each of the plurality of gratings is equal to a width of a corresponding drive electrode, and the width of each of the plurality of gratings is equal to a longitudinal spacing between adjacent gratings, along a column direction of the plurality of gratings.

In some embodiments, a thickness of each of the plurality of gratings ranges from 200 nm to 1000 nm along a direction from the first substrate to the second substrate.

In some embodiments, all of the first electrode, the second electrode, and the drive electrodes are made of a transparent conductive material.

In some embodiments, the first electrode is a plate-shaped electrode, and has a thickness ranging from 100 nm to 1000 nm; and the second electrode is a plate-shaped electrode.

In some embodiments, the display module further includes a first protection layer arranged on a surface of the first substrate on a side thereof facing away from the second substrate, and a second protection layer arranged on a surface of the second substrate on a side thereof facing away from the first substrate.

In some embodiments, the first substrate is an array substrate, and the second substrate is a color filter substrate; or the first substrate is the color filter substrate, and the second substrate is the array substrate.

In another aspect, the embodiments of the disclosure provide a display device, including a display module, wherein the display module includes a first substrate and a second substrate, both of which are cell-assembled with each other, and a first electrode, a liquid crystal layer, and a second electrode arranged between the first substrate and the second substrate in that order, wherein the display module further includes a plurality of gratings distributed in an array on a surface of the first electrode on a side thereof facing the liquid crystal layer, and drive electrodes arranged respectively on sides of respective gratings facing away from the first electrode; the liquid crystal layer includes only positive liquid crystal molecules; wherein both a refractive index of the first electrode and a refractive index of the first substrate are greater than a normal refractive index $n_o$ of liquid crystal in the liquid crystal layer; and a refractive index of each of the plurality of gratings lies between the normal refractive index $n_o$ and an abnormal refractive index $n_e$ of the liquid crystal.

In some embodiments, the liquid crystal is blue-phase liquid crystal.

In some embodiments, the refractive index of the first electrode is greater or less than the refractive index of the first substrate.

In some embodiments, the display module further includes a first insulation layer arranged on the surface of the first electrode on the side thereof facing the liquid crystal layer, and a second insulation layer arranged on a surface of the second electrode on a side thereof facing the liquid crystal layer; the plurality of gratings are arranged on a surface of the first insulation layer on a side thereof facing the liquid crystal layer.

In some embodiments, both a refractive index of the first insulation layer and a refractive index of the second insulation layer are greater than the normal refractive index $n_o$ of the liquid crystal.

In some embodiments, a length of each of the plurality of gratings is equal to a length of a corresponding drive electrode, and the length of each of the plurality of gratings is equal to a transverse spacing between adjacent gratings, along a row direction of the plurality of gratings; and a width of each of the plurality of gratings is equal to a width of a corresponding drive electrode, and the width of each of the plurality of gratings is equal to a longitudinal spacing between adjacent gratings, along a column direction of the plurality of gratings.

In some embodiments, a thickness of each of the plurality of gratings ranges from 200 nm to 1000 nm along a direction from the first substrate to the second substrate.

In some embodiments, all of the first electrode, the second electrode, and the drive electrodes are made of a transparent conductive material.

In some embodiments, the first electrode is a plate-shaped electrode, and has a thickness ranging from 100 nm to 1000 nm; and the second electrode is a plate-shaped electrode.

In some embodiments, the display module further includes a first protection layer arranged on a surface of the first substrate on a side thereof facing away from the second substrate, and a second protection layer arranged on a surface of the second substrate on a side thereof facing away from the first substrate.

In some embodiments, the first substrate is an array substrate, and the second substrate is a color filter substrate; or the first substrate is the color filter substrate, and the second substrate is the array substrate.

BRIEF DESCRIPTION OF THE DRAWINGS

In order to make the technical solutions according to embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

The technical solutions according to the embodiments of the disclosure will be described below clearly and fully with reference to the drawings in the embodiments of the disclosure, and apparently the embodiments to be described are only a part but not all of the embodiments of the disclosure. Based upon the embodiments here of the disclosure, all of the other embodiments which can occur to those ordinarily skilled in the art without any inventive effort shall fall into the scope of the disclosure.

The embodiments of the disclosure provide a display module and a display device, where the orientation of liquid crystal molecules is controlled using electrodes in the display module, so as to address the problem in the related art of a degraded light exiting effect of the display module due to poor uniformity of an orientation layer. Where the display device is a Liquid Crystal Display (LCD) or an Organic Light-Emitting Diode (OLED) display device.

Figure 1:
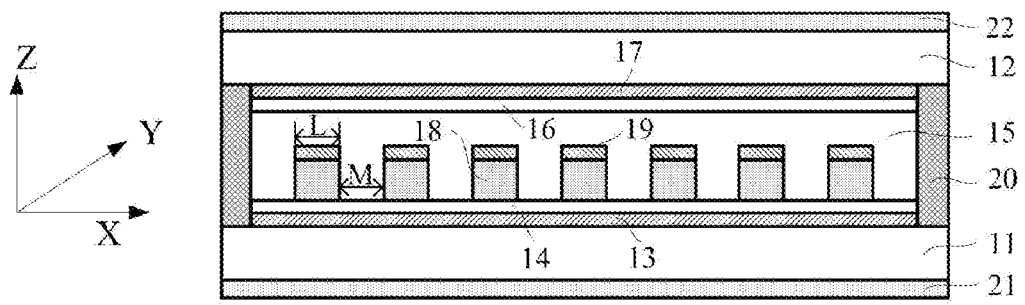
FIG. 1 is a schematic structural diagram of a display module according to the embodiments of the disclosure.
Figure 2:
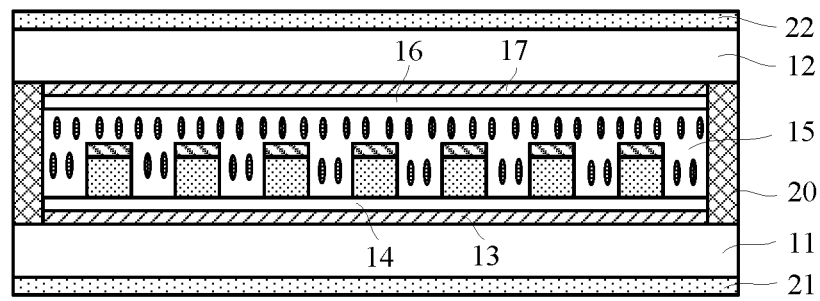
FIG. 2 is a schematic diagram of an operating state of liquid crystal molecules when a first electrode and a second electrode are powered on in the display module as illustrated in FIG. 1.
Figure 3:
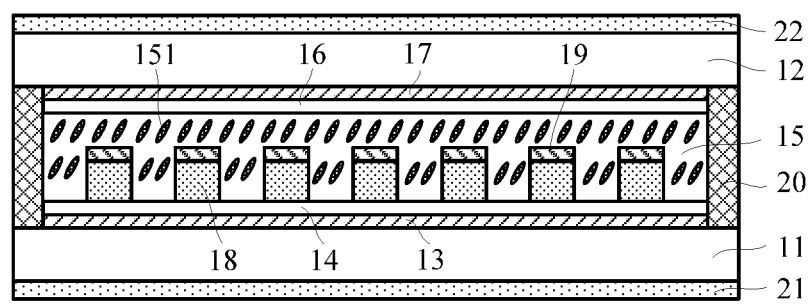
FIG. 3 is a schematic diagram of an operating state of liquid crystal molecules when the first electrode, the second electrode, and drive electrodes are powered on in the display module as illustrated in FIG. 1.

As illustrated in FIG. 1, FIG. 2, and FIG. 3, a display module according to the embodiments of the disclosure includes a first substrate 11 and a second substrate 12, both of which are cell-assembled with each other, and a first electrode 13, a liquid crystal layer 15 and a second electrode 17 arranged between the first substrate 11 and the second substrate 12 in that order.

Where the display module further includes a plurality of gratings 18 distributed in an array on a surface of the first electrode 13 on a side thereof facing the liquid crystal layer 15, and drive electrodes 19 arranged respectively on sides of respective gratings 18 facing away from the first electrode 13.

Where the liquid crystal layer 15 includes only positive liquid crystal molecules 151; both a refractive index of the first electrode 13 and a refractive index of the first substrate 11 are greater than a normal refractive index $n_o$ of liquid crystal in the liquid crystal layer 15; and a refractive index of each of the plurality of gratings 18 lies between the normal refractive index $n_o$ and an abnormal refractive index $n_e$ of the liquid crystal.

The display module above according to the embodiments of the disclosure includes the plurality of gratings 18 distributed in an array at the liquid crystal layer 15, and the drive electrodes 19 arranged respectively on sides of respective gratings 18 facing away from the first electrode 13, and the liquid crystal layer 15 includes only the positive liquid crystal molecules 151, and the refractive index of the first substrate 11 are greater than the normal refractive index $n_o$ of liquid crystal in the liquid crystal layer 15, and the refractive index of each of the plurality of gratings 18 lies between the normal refractive index $n_o$ and the abnormal refractive index $n_e$ of the liquid crystal, thus as illustrated in FIG. 2, when the first electrode 13 and the second electrode 17 of the display module are powered on, all of the positive liquid crystal molecules 151 are arranged in vertical orientation, the liquid crystal molecules 151 between the gratings 18 constitute together an optical waveguide layer, and light rays can only be transmitted within the liquid crystal layer 15, and cannot be transmitted through the liquid crystal layer 15, so the display module is in a dark state. And as illustrated in FIG. 3, when all of the first electrode 13, the second electrode 17, and the drive electrodes 19 are powered on, the positive liquid crystal molecules 151 are deflected from the vertical orientation under the action of the drive electrodes 19, the optical waveguide layer consisted of the gratings 18 and the liquid crystal layer 15 is damaged, and the light rays can be transmitted through the liquid crystal layer 15, and exit from the light exit side of the display module, so the display module displays in a grayscale mode. Since the orientation of the liquid crystal molecules 151 is controlled by forming an electromagnetic field using the drive electrodes 19 additionally arranged in the display module above according to the embodiments of the disclosure, the display module can control the orientation of the liquid crystal molecules 151 simply and uniformly to thereby address the problem of a light exiting effect being degraded because the orientation layer becomes non-uniform in thickness due to non-uniform coating of the PI.

In some embodiments, as illustrated in FIG. 1 to FIG. 3, the first substrate 11 and the second substrate 12 are cell-assembled with each other through a frame sealant 20. Where the first substrate 11 is an array substrate or a color filter substrate, and correspondingly the second substrate 12 is the color filter substrate or the array substrate.

In some embodiments, as illustrated in FIG. 1 to FIG. 3, the display module further includes a first insulation layer 14 arranged on the surface of the first electrode 13 on the side thereof facing the liquid crystal layer 15, and a second insulation layer 16 arranged on a surface of the second electrode 17 on a side thereof facing the liquid crystal layer 15; the plurality of gratings 18 are arranged on a surface of the first insulation layer 14 on a side thereof facing the liquid crystal layer 15.

In some embodiments, as illustrated in FIG. 1 to FIG. 3, the first electrode 13, the first insulation layer 14, the liquid crystal layer 15, the second insulation layer 16, and the second electrode 17 are stacked on a surface of the first substrate 11 on a side thereof facing the second substrate 12 in that order. Where the first electrode 13 is an anode or a cathode, and correspondingly the second electrode 17 is the cathode or the anode.

In some embodiments, the refractive index of the first electrode 13 is greater or less than the refractive index of the first substrate 11; of course, the refractive index of the first electrode 13 can also be equal to the refractive index of the first substrate 11, which will not be limited herein.

In some embodiments, the first electrode 13 and the second electrode 17 are plate-shaped electrodes or strip-shaped electrodes. In some embodiments, the first electrode 13 and the second electrode 17 are made of silver, molybdenum, or another transparent metal material; or are made of indium tin oxide (ITO), indium zinc oxide (IZO), or another transparent metal oxide material.

In some embodiments, a thickness of the first electrode 13 ranges from 100 nm to 10000 nm; a thickness of the second electrode 17 ranges from 100 nm to 1000 nm; and the thicknesses of the first electrode 13 and the second electrode 17 can be set as needed in a practical production process.

In some embodiments, as illustrated in FIG. 1 to FIG. 3, the plurality of gratings 18 are distributed in an array in the liquid crystal layer 15, i.e. the liquid crystal layer 15 covers the plurality of gratings 18. In some embodiments, each of the plurality of gratings 18 is arranged corresponding to one of pixels, and each of the plurality of gratings 18 is arranged with a corresponding drive electrode 19 on a side thereof facing away from the first electrode 13 to control the orientation of the liquid crystal molecules 151 in the liquid crystal layer 15.

In some embodiments, the liquid crystal in the liquid crystal layer 15 is blue-phase liquid crystal, and the liquid crystal in the liquid crystal layer 15 can also be made of a liquid crystal material applicable to a product in a Twisted Nematic (TN) display mode, a product in an In-Phase Switching (IPS) display module, a product in a Fringe Field Switching (FFS) display mode, or a product in a Vertical Alignment (VA) display module.

In some embodiments, both a refractive index of the first insulation layer 14 and a refractive index of the second insulation layer 16 are greater than the normal refractive index $n_o$ of the liquid crystal in the liquid crystal layer 15. In some embodiments, both the refractive index of the first insulation layer 14 and the refractive index of the second insulation layer 16 are greater or less than the refractive index of the first electrode 13, or are greater or less than the refractive index of the first substrate 11.

In some embodiments, the first insulation layer 14 and the second insulation layer 16 are made of a transparent organic medium.

In some embodiments, a thickness of the first insulation layer 14 ranges from 50 nm to 1000 nm, and a thickness of the second insulation layer 16 ranges from 50 nm to 1000 nm. For example, the thickness of the first insulation layer 14, or the thickness of the second insulation layer 16 can be 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 350 nm, 400 nm, 450 nm, 500 nm, 550 nm, 600 nm, 650 nm, 700 nm, 750 nm, 800 nm, 850 nm, 900 nm, 950 nm, or 1000 nm, etc.

In some embodiments, as illustrated in FIG. 1, a length L of each of the plurality of gratings 18 is equal to a length of a corresponding drive electrode 19, and the length L of each of the plurality of gratings 18 is equal to a traverse spacing M between adjacent gratings 18, in a row direction (i.e. X direction as illustrated in FIG. 1) of the plurality of gratings 18; and a width of each of the plurality of gratings 18 is equal to a width of a corresponding drive electrode 19, and the width of each of the plurality of gratings 18 is equal to a longitudinal spacing between adjacent gratings 18, in a column direction (i.e. Y direction as illustrated in FIG. 1, where the Y direction is perpendicular to the X direction) of the plurality of gratings 18.

In some embodiments, each of the plurality of gratings 18 is made of a transparent material.

In some embodiments, the refractive index of each of the plurality of gratings lies between the normal refractive index $n_o$ and the abnormal refractive index $n_e$ of the liquid crystal (including the normal refractive index $n_o$ and the abnormal refractive index $n_e$); for example, the refractive index of each of the plurality of gratings 18 is equal to the normal refractive index $n_o$ of the liquid crystal in the liquid crystal layer 15.

In some embodiments, along the row direction of the plurality of gratings 18, a period P of the plurality of gratings 18 is equal to a sum of the length L of each of the plurality of gratings 18, and the spacing M between adjacent gratings 18; and a duty ratio of the plurality of gratings 18 is equal to a ratio of the length L of each of the plurality of gratings 18 to the period P of the plurality of gratings 18. In some embodiments, the duty ratio of the plurality of gratings 18 can be 0.5, or can be another value selected according to the direction and color of the exiting light.

Alike, the thickness of each of the plurality of gratings 18 can also be set as needed in practical. For example, the thickness of each of the plurality of gratings 18 can be set according to the optical binding capacity (such as a difference between a refractive index of an optical waveguide and a refractive index of a medium surrounding the optical waveguide, or a waveguide mode, etc.) of the optical waveguide layer, so long as the effect of the electrodes on the optical waveguide layer can be isolated well enough to prevent the light from being leaked in the dark state.

In some embodiments, as illustrated in FIG. 1, the thickness of each of the plurality of gratings 18 ranges from 200 nm to 1000 nm along a direction from the first substrate 11 to the second substrate 12 (i.e. Z direction as illustrated in FIG. 1, where the Z direction is perpendicular to the X direction and the Y direction). For example, the thickness of each of the plurality of gratings 18 can be 200 nm, 300 nm, 400 nm, 500 nm, 600 nm, 700 nm, 800 nm, 900 nm, or 1000 nm, along the direction from the first substrate 11 to the second substrate 12.

In some embodiments, the thicknesses of gratings 18 corresponding to pixels with different colors are the same or different. For example, a grating 18 corresponding to an R pixel, a grating 18 corresponding to a G pixel, and a grating 18 corresponding to a B pixel have a same thickness, or have different thicknesses respectively.

In some embodiments, all of the first electrode 13, the second electrode 17, and the drive electrodes 19 are made of a transparent conductive material. In some embodiments, the transparent conductive material of which the first electrode 13, the second electrode 17, and the drive electrodes 19 are made is silver, molybdenum, or another transparent metal material, or is indium tin oxide (ITO), indium zinc oxide (IZO), or another transparent metal oxide material.

In some embodiments, the first electrode 13 is a plate-shaped electrode or a strip-shaped electrode, and when the first electrode 13 is a plate-shaped electrode, the thickness of the first electrode 13 ranges from 100 nm to 1000 nm, and for example, a thickness thereof can be 100 nm, 200 nm, 300 nm, 400 nm, 500 nm, 600 nm, 700 nm, 800 nm, 900 nm, or 1000 nm, etc. Alike, the second electrode 17 is a plate-shaped electrode or a strip-shaped electrode corresponding to the first electrode 13, and when the second electrode 17 is a plate-shaped electrode, the thickness of the second electrode 17 ranges from 100 nm to 1000 nm, and for example, a thickness thereof can be 100 nm, 200 nm, 300 nm, 400 nm, 500 nm, 600 nm, 700 nm, 800 nm, 900 nm, or 1000 nm, etc.

In some embodiments, a thickness of each of the drive electrodes 19 ranges from 70 nm to 300 nm, and for example, a thickness thereof can be 70 nm, 80 nm, 90 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, or 300 nm, etc.

In some embodiments, in order to improve the security of the display module, and to prevent the display module from being damaged, as illustrated in FIG. 1 to FIG. 3, the display module further includes a first protection layer 21 arranged on a surface of the first substrate 11 on a side thereof facing away from the second substrate 12, and a second protection layer 22 arranged on a surface of the second substrate 12 on a side thereof facing away from the first substrate 11.

In some embodiments, the first protection layer 21 and the second protection layer 22 are made of glass, or another transparent material, e.g., polymethyl methacrylate (PMMA), polyethylene glycol terephthalate (PET), or Polycarbonate (PC), etc.

In some embodiments, the first substrate 11 and the second substrate 12 above are made of glass, resin, or another material, and the first substrate 11 and the second substrate 12 are required to be highly planar and parallel to each other. In some embodiments, both the thickness of the first substrate 11 and the thickness of the second substrate 12 range from 0.1 mm to 2 mm, and for example, the thickness of the first substrate 11 or the thickness of the second substrate 12 can be 0.1 mm, 0 2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, or 2 mm, etc.

Based upon the same inventive concept, the embodiments of the disclosure further provide a display device including the display module above according to any one of the embodiments of the disclosure. And reference can be made to the embodiments of the display module above for an implementation of the display device, so a repeated description thereof will be omitted here.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display module, comprising a first substrate and a second substrate, both of which are cell-assembled with each other, and a first electrode, a liquid crystal layer, and a second electrode arranged between the first substrate and the second substrate in that order, wherein:
   the display module further comprises a plurality of gratings distributed in an array on a surface of the first electrode on a side thereof facing the liquid crystal layer, and drive electrodes arranged respectively on sides of respective gratings facing away from the first electrode;
   the liquid crystal layer comprises only positive liquid crystal molecules;
   both a refractive index of the first electrode and a refractive index of the first substrate are greater than a normal refractive index $n_o$ of liquid crystal in the liquid crystal layer; and
   a refractive index of each of the plurality of gratings lies between the normal refractive index $n_o$ and an abnormal refractive index $n_e$ of the liquid crystal.

2. The display module according to claim 1, wherein the liquid crystal is blue-phase liquid crystal.

3. The display module according to claim 1, wherein the refractive index of the first electrode is greater or less than the refractive index of the first substrate.

4. The display module according to claim 1, wherein the display module further comprises a first insulation layer arranged on the surface of the first electrode on the side thereof facing the liquid crystal layer, and a second insulation layer arranged on a surface of the second electrode on a side thereof facing the liquid crystal layer;
   the plurality of gratings are arranged on a surface of the first insulation layer on a side thereof facing the liquid crystal layer.

5. The display module according to claim 4, wherein both a refractive index of the first insulation layer and a refractive index of the second insul ation layer are greater than the normal refractive index $n_o$ of the liquid crystal.

6. The display module according to claim 1, wherein a length of each of the plurality of gratings is equal to a length of a corresponding drive electrode, and the length of each of the plurality of gratings is equal to a transverse spacing between adjacent gratings, along a row direction of the plurality of gratings; and
   a width of each of the plurality of gratings is equal to a width of a corresponding drive electrode, and the width of each of the plurality of gratings is equal to a longitudinal spacing between adjacent gratings, along a column direction of the plurality of gratings.

7. The display module according to claim 1, wherein a thickness of each of the plurality of gratings ranges from 200 nm to 1000 nm along a direction from the first substrate to the second substrate.

8. The display module according to claim 1, wherein all of the first electrode, the second electrode, and the drive electrodes are made of a transparent conductive material.

9. The display module according to claim 1, wherein the first electrode is a plate-shaped electrode, and has a thickness ranging from 100 nm to 1000 nm; and the second electrode is a plate-shaped electrode.

10. The display module according to claim 1, wherein the display module further comprises a first protection layer arranged on a surface of the first substrate on a side thereof facing away from the second substrate, and a second protection layer arranged on a surface of the second substrate on a side thereof facing away from the first substrate.

11. The display module according to claim 1, wherein the first substrate is an array substrate and the second substrate is a color filter substrate; or the first substrate is the color filter substrate, and the second substrate is the array substrate.

12. A display device, comprising a display module, wherein the display module comprises a first substrate and a second substrate, both of which are cell-assembled with each other, and a first electrode, a liquid crystal layer, and a second electrode arranged between the first substrate and the second substrate in that order, wherein:

the display module further comprises a plurality of gratings distributed in an array on a surface of the first electrode on a side thereof facing the liquid crystal layer, and drive electrodes arranged respectively on sides of respective gratings facing away from the first electrode;

the liquid crystal layer comprises only positive liquid crystal molecules;

both a refractive index of the first electrode and a refractive index of the first substrate are greater than a normal refractive index $n_o$ of liquid crystal in the liquid crystal layer; and a refractive index of each of the plurality of gratings lies between the normal refractive index $n_o$ and an abnormal refractive index $n_e$ of the liquid crystal.

13. The display device according to claim 12, wherein the liquid crystal is blue-phase liquid crystal.

14. The display device according to claim 12, wherein the refractive index of the first electrode is greater or less than the refractive index of the first substrate.

15. The display device according to claim 12, wherein the display module further comprises a first insulation layer arranged on the surface of the first electrode on the side thereof facing the liquid crystal layer, and a second insulation layer arranged on a surface of the second electrode on a side thereof facing the liquid crystal layer;

the plurality of gratings are arranged on a surface of the first insulation layer on a side thereof facing the liquid crystal layer.

16. The display device according to claim 15, wherein both a refractive index of the first insulation layer and a refractive index of the second insulation layer are greater than the normal refractive index $n_o$ of the liquid crystal.

17. The display device according to claim 12, wherein a length of each of the plurality of gratings is equal to a length of a corresponding drive electrode, and the length of each of the plurality of gratings is equal to a transverse spacing between adjacent gratings, along a row direction of the plurality of gratings; and a width of each of the plurality of gratings is equal to a width of a corresponding drive electrode, and the width of each of the plurality of gratings is equal to a longitudinal spacing between adjacent gratings, along a column direction of the plurality of gratings.

18. The display device according to claim 12, wherein a thickness of each of the plurality of gratings ranges from 200 nm to 1000 nm along a direction from the first substrate to the second substrate.

19. The display device according to claim 12, wherein the first electrode is a plate-shaped electrode, and has a thickness ranging from 100 nm to 1000 nm; and the second electrode is a plate-shaped electrode.

20. The display device according to claim 12, wherein the first substrate is an array substrate and the second substrate is a color filter substrate; or the first substrate is the color filter substrate, and the second substrate is the array substrate.

* * * * *